United States Patent [19]
Inamoto et al.

[11] 3,897,479
[45] July 29, 1975

[54] PROCESS FOR THE HALOGENATION OF ADAMANTANES

[75] Inventors: Yoshiaki Inamoto, Wakayama; Takeji Kadono, Kainan; Naotake Takaishi, Wakayama, all of Japan

[73] Assignee: Kao Soap Co., Ltd., Tokyo, Japan

[22] Filed: Oct. 29, 1973

[21] Appl. No.: 410,508

[30] Foreign Application Priority Data
Oct. 30, 1972   Japan.............................. 47-108602

[52] U.S. Cl. ........ 260/468 G; 260/514 G; 260/644; 260/648 R
[51] Int. Cl...................... C07c 51/00; C07c 79/12
[58] Field of Search......... 260/468, 514, 644, 648 R

[56] References Cited
UNITED STATES PATENTS
3,666,806   5/1972   Moore............................ 260/617 F OTHER PUBLICATIONS
Fort et al., Chem. Reviews, 287–289, (1965).

Primary Examiner—Robert Gerstl
Attorney, Agent, or Firm—Woodhams, Blanchard and Flynn

[57] ABSTRACT
A compound of the formula:

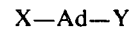

(II)

is prepared by reacting a compound:

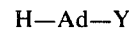

(I)

with a hydrogen halide or a metal halide in 70–98 wt. % sulfuric acid in carbon tetrachloride or cyclohexane in the presence of t-butanol wherein,
  Ad is adamantane or an alkyl substituted adamantane radical bearing X and Y as two bridgehead substituents,
  X is a bridgehead chlorine or bromine,
  H is a bridgehead hydrogen, and
  Y is a bridgehead substituent having a Taft's polar substituent ($\sigma^*$) of 1.50 or less.

5 Claims, No Drawings

PROCESS FOR THE HALOGENATION OF ADAMANTANES

BACKGROUND OF THE INVENTION

1. Field of the Invention

This invention relates to a process for the monohalogenation of adamantanes.

2. Description of the Prior Art

Several processes for the monohalogenation of adamantanes are known. For example, monobrominated adamantanes can be obtained by heating adamantanes together with bromine under reflux [H. Stetter et al. Ber., 95, 667 (1962) and K. Bott, Ber., 101, 564 (1968)]. However, monochlorination cannot be effected in the same manner by introducing gaseous chlorine into a reaction zone containing adamantanes. Monochloroadamantanes can be obtained effectively by the reaction of adamantanes with t-butyl chloride in the presence of aluminum chloride catalyst [K. Gerzon et al., J. Med. Chem. 6, 760 (1963)].

Chlorination and bromination can be effected by the reaction of adamantanes with a corresponding hydrogen halide or a metal salt thereof in concentrated sulfuric acid solvent (R. E. Moore et al., U.S. Pat. No. 3,666,806).

In the processes described above, the direct bromination process with bromine has little commercial value, because expensive bromine is used in large amount. Moreover, according to the process of Gerzon et al., wherein t-butyl chloride and aluminum chloride are used, a considerable amount of 1,3-dichloride is also formed. Furthermore, according to the process of Moore, et al., 1,3-dihalides and hydroxy halides are produced in large amounts. It is quite difficult to separate these by-products from the desired monohalides.

Thus, all the processes hitherto known are unsatisfactory to obtain the monochlorides.

SUMMARY OF THE INVENTION

We have discovered a commercially advantageous process for obtaining various adamantane monohalides (chloride or bromide) of a high purity in a high yield by the reaction of adamantane or 1-substituted adamantanes with hydrogen halide or metal halide in concentrated sulfuric acid and carbon tetrachloride or cyclohexane solvent. The present invention provides a process for preparing 1-substituted or unsubstituted-3-halogenoadamantanes containing practically no dihalides in a yield of higher than 90% by the reaction of 1-substituted or unsubstituted adamantanes with a corresponding hydrogen halide or metal halide in concentrated sulfuric acid in carbon tetrachloride or cyclohexane or solvent, in the presence of t-butanol.

The halogenation reaction of the present invention is based on the following chemical reactions:

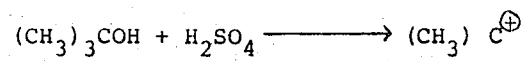

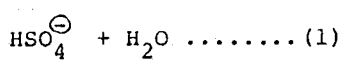

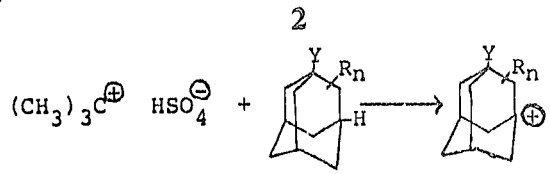

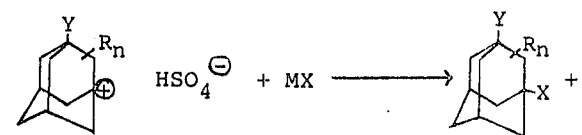

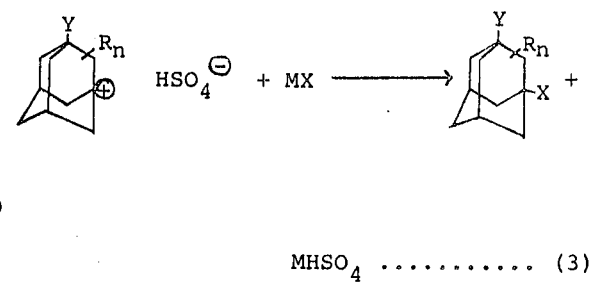

wherein Y represents H or a substituent at the 1-position of 1-substituted adamantane, X is chlorine or bromine, M is hydrogen, an alkali metal, an alkaline earth metal, boron or aluminum, R is H or an alkyl group of 1 to 4 carbon atoms and n is 1 or 2. When R is alkyl, it is preferably substituted on a 5- or 7- position bridgehead carbon of the adamantane nucleus.

In carrying out the process of the present invention, (1) a hydrogen halide gas is introduced into, or a metal halide is added to, a mixture of (2) concentrated sulfuric acid, (3) carbon tetrachloride or cyclohexane and (4) a starting adamantane compound of the formula

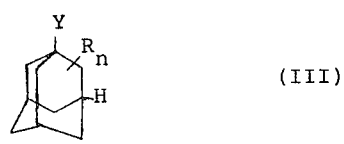

while (5) t-butanol is added thereto incrementally, e.g., dropwise, with mixing such as stirring at a definite reaction temperature. Such a mode and sequence of adding the reagents is essential in the present invention. If t-butanol is added not dropwise, but rather is added in one quantity, or if the order of the addition of the reagents is changed or reversed, the yield of the final product is reduced extremely.

It has been found by the inventors that the success of the process of the present invention depends on the electronic nature of the substituent at the 1-position of the starting adamantane (III). That is, any 1-substituted adamantane whose substituent has a Taft's polar substituent constant $(\sigma^*)$ (R. W. Taft, Jr., J. Am. Chem. Soc., 74, 3120 (1952); in M. S. Newman (Ed.)'s "Steric Effects in Organic Chemistry," p 556 (1956), John Wiley and Sons, Inc., New York, N.Y.) larger than +1.5 gives so little halide product that the process is not practical as a synthesis of the desired halide. More particularly, the chlorination reaction does not proceed practically with 1-carboxy-$(\sigma^*=+2.9)$ or 1-ethoxycarbonyl-$(\sigma^*=+2.0)$ adamantanes. The yield of 3-chloromethyl-1-chloroadamantane is only 9% in the reaction of 1-chloromethyl-$(\sigma^*=+1.9)$ adamantane.

These experimental results are well supported by the preliminary kinetic study of the inventors, which showed that a plot of the logarithm of the unimolecular rate constants of the formation of adamantyl halide against $\sigma^*$ of the 1-substituent gives an excellent straight line (Hammett-Taft relation) with a negative reaction constant ($\rho^*$), this fact in turn showing the reaction (2) is the rate-determining step. It is a critical feature of the invention, therefore, that the substituent at the 1-position (Y) of the starting adamantane has a Taft's polar substituent constant of not more than about +1.50. The list of groups having the required Taft's constant is given in Table XII (Substituent R Nos. 5a to 47), page 619 in the above M. S. Newman's "Steric Effects in Organic Chemistry."

The process of the present invention is applicable to chlorination and bromination reactions, but not to fluorination or iodination. If hydrogen fluoride (or sodium fluoride or calcium fluoride) is used in the reaction, the main product is hydroxyadamantanes. Hydrogen iodide cannot be used, since it is oxidized into iodine in sulfuric acid.

As chlorine or bromine sources represented by MX in above reaction formula (3), various metal halides soluble in sulfuric acid such as alkali metal halides, alkaline earth metal halides, boron halides and aluminum halides can be used in addition to hydrogen halides.

The concentration of the sulfuric acid used in the present invention is 70 to 98 wt. %. If sulfuric acid of a concentration less than 70 % is used, the yield is substantially 0 (zero). If sulfuric acid of a concentration higher than 98 % is used, a side oxidation reaction also occurs to produce adamantanone-2. The preferred concentration range of the sulfuric acid is 90–98 %. The sulfuric acid is used in a quantity of 10 to 80 parts by weight, preferably 20 to 60 parts by weight, per one part of t-butanol. The use of sulfuric acid in a quantity less than 10 parts per one part of t-butanol is not preferred, because water formed by the reaction with t-butanol dilutes the sulfuric acid to decrease the concentration thereof to a value lower than the effective lower limit thereof.

The quantity of carbon tetrachloride or cyclohexane used in the present invention is 10 to 30 parts by weight per one part of the starting adamantane (III). One of the roles of carbon tetrachloride or cyclohexane in the process of the present invention is to dissolve the solid adamantanes and to disperse the adamantanes in concentrated sulfuric acid. The use of carbon tetrachloride or cyclohexane is indispensable with respect to the improvement in yield of the product of the invention.

The quantity of t-butanol used in 1 to 5 moles, preferably 2 to 3 moles, per one mole of the starting adamantane (III). The t-butanol preferably is mixed with a further quantity of the solvent, i.e., carbon tetrachloride or cyclohexane, because t-butanol has a high melting point and may be solid at room temperature, and it is required to be dissolved in a solvent for its dropwise addition.

The amount of the hydrogen halide or metal salt thereof used is in the range of 5 to 20 moles per one mole of the starting adamantane (III). It is desirable that at least one equivalent (mole), preferably 2 to 3 equivalents, of the hydrogen halide or metal salt thereof, per one mole of the starting adamantane (III), shall have been added to the reaction system before the completion of the addition of t-butanol. If the quantity of hydrogen halide or metal salt thereof is less than 1 equivalent, the yield of the final product is poor and the byproduct of isobutyladamantane becomes appreciable.

The reaction temperature is 0° to 20°C, preferably 5° to 10°C.

During the reaction period, the total time required for adding the mixture of t-butanol and carbon tetrachloride or cyclohexane is from about 10 to 60 minutes, preferably at least 15 minutes. The rate of the introduction of the hydrogen halide or salt should be higher than 6 moles/hr., preferably 12 moles/hr. per mole of starting adamantane (III). After the addition of t-butanol is completed the remaining predetermined amount of the hydrogen halide or salt should be added and also the reaction should be preferably continued for at least one hour after completion of the addition of t-butanol.

The process of this invention is expressed as follows:

A method for preparing a compound of the formula

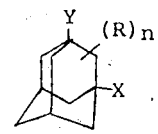

wherein

Y is H or a substituent having a Taft's polar substituent constant of not more than about +1.50, X is chloro or bromo, R is H or alkyl of one to 4 carbon atoms, and $n$ is 1 or 2 which comprises forming a reaction mixture consisting essentially of (1) sulfuric acid having a concentration of 70 to 98 weight percent, (2) carbon tetrachloride or cyclohexane and (3) a compound of the formula

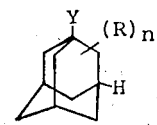

wherein Y, R and $n$ are as defined above, adding to said reaction mixture, at from 0° to 20°C, continuously or in increments over an extended period of time, (4) a compound of the formula MX, wherein X is as defined above and M is H, alkali metal, alkaline earth metal, boron or aluminum, and simultaneously adding to said reaction mixture in increments over a period of time, (5) t-butanol, while vigorously stirring the reaction mixture, the amount of t-butanol (5) added to the reaction mixture being from 1 to 5 moles, per 1 mole of compound (3), the amount of sulfuric acid (1) being from 10 to 80 parts by weight per one part by weight to t-butanol, the amount of carbon tetrachloride or cyclohexane (2) being from 10 to 30 parts by weight per one part by weight of compound (3) and the amound of compound MX (4) being from 5 to 20 moles per one mole of compound (3), the compound MX (4) being added at a rate such that at least one equivalent of MX shall have been added before completion of the addition of t-butanol (5);

and recovering the compound of the first-named formula from the reaction product.

The most simple method of isolation of the product from the reaction mixture is as follows:

The reaction mixture is poured onto broken ice pieces. The extraction is effected with an inert solvent. The extract is washed successively with aqueous sodium bicarbonate and water. After drying with calcium chloride, the solvent is concentrated to obtain the crude halide. Although the halide thus obtained is sufficiently pure, the most advantageous method of further purification is distillation or recrystallization depending on the character of the halide.

The process can be applied for all 1-substituted adamantanes and alkyl adamantanes having at least one unsubstututed tertiary carbon atom, whose substituent in the 1-position has a Taft's polar substituent constant $\sigma^*$ of smaller than +1.50. In such a case, the reaction conditions are not changed essentially by varying this substituent.

The monohalides obtained by the process of the present invention are useful as starting materials or intermediates for synthesis of various chemicals, pharmeceuticals, industrial chemicals or surfactants and lubricants.

The present invention will be further described by reference to the following illustrative Examples. In the Examples, the melting points are uncorrected.

EXAMPLE 1

Hydrogen chloride gas was introduced at a rate of 100ml./min. into a mixture of 300 g of 96 % sulfuric acid, 75ml. of carbon tetrachloride and 5 g of adamantane which was kept at 5°–10°C by external cooling under thorough stirring for 4 hours, while a mixture of 5 g of t-butanol and 20 ml. of carbon tetrachloride was added thereto dropwise over a period of 30 minutes during the beginning of the addition of hydrogen chloride gas. The reaction mixture was poured onto 500 g of broken ice pieces to separate a carbon tetrachloride layer. The aqueous layer was extracted twice with 50ml. of carbon tetrachloride. The carbon tetrachloride solution was washed successively with water, aqueous sodiumn bicarbonate solution and finally with water until it became neutral (litmus paper) and then it was dried with calcium chloride. The dried carbon tetrachloride solution was concentrated to precipitate crystals, which were taken out by filtration to obtain 5.7 g (yield: 91.3 %) of crude 1-chloroadamantane. The product was recrystallized from a mixture of water/methanol (1:9) to obtain a pure product of m.p. 166°–167°C. [Melting point 165°C according to H. Stetter, et al., Ber., 93, 226 (1960)].

Elementary anaylsis:
Calcd. for $C_{10}H_{15}Cl$: C 70.37; H 8.86; Cl 20.77%.
Found: C 70.2; H 8.9; Cl 20.6 %.

EXAMPLE 2

5.5 Grams yield: 88.1 %) of crude 1-chloroadamantane were obtained from a mixture of 300 g of 96 % sulfuric acid, 75ml. of cyclohexane and 5 g of adamantane in the same manner as in Example 1. By recrystallization from a mixture of water and methanol (1:9), pure product of m.p. 166°–167°C was obtained.

EXAMPLE 3

Hydrogen chloride gas was introduced at a rate of 200ml./min. into a mixture of 11.6 g of 1-methyladamantane, 150ml. of carbon tetrachloride and 600 g of 96 % sulfuric acid which was kept at 5°–10°C by external cooling under thorough stirring for 4 hours while a mixture of 11.6 g of t-butanol and 30ml. of carbon tetrachloride was added thereto dropwise over 30 minutes at the beginning of the 4 hours period. The reaction mixture was then poured onto 1 Kg of broken ice pieces. Thereafter, the same procedure as in Example 1 was repeated. After concentration followed by distillation under reduced pressure, a fraction of 103°–105°C/12 mmHg was collected to obtain 12.4 g (yield: 86.5 %) of 1-chloro-3-methyladamantane.

Elementary analysis:
Calcd. for $C_{11}H_{17}Cl$: C 71.53; H 9.28; Cl 19.19%.
Found:C 71.5; H 9.1; Cl 19.3 %.

The IR Spectrum, NMR spectrum and mass spectrum of this product coincided with those of a sample obtained by a process of Stetter, et al. [Ber. 99, 925 (1966)].

EXAMPLE 4 (control)

Hydrogen chloride gas was introduced at a rate of 100ml./min. into a mixture of 5 g of 1-methyladamantane, 50 ml. of carbon tetrachloride and 300 g of 96 % sulfuric acid which was kept at 5°–10°C by external cooling under thorough stirring for 4 hours. The reaction mixture was treated in the same manner as in Example 1 to recover 4.8 g (96 %) of unreacted 1-methyladamantane.

EXAMPLE 5

18 Grams of sodium chloride were added in about 20 equal portions to a mixture of 3 g of 1-adamantyl-acetic acid, 60 ml. of carbon tetrachloride and 200 g of 96 % sulfuric acid which was kept at 5°–10°C by external cooling under thorough stirring over a period of 6 hours while a mixture of 9 g of t-butanol and 20ml. of carbon tetrachloride was added thereto dropwise over 30 minutes. The reaction mixture was poured onto 300 g of broken ice pieces. The crystalline precipitate was filtered out, washed with water sufficiently and air-dried to obtain 3.2 g (yield: 91.1 %) of crude 1-carboxyl methyl-3-chloroadamantane.

The product was recrystallized from a mixture of water and methanol (3:7) to obtain the pure product of m.p. 182°–183.5°C.

Elementary analysis:
Calcd. for $C_{12}H_{17}O_2Cl$: C 63.02; H 7.49; Cl 15.50%.
Found: C 62.8; H 7.3; Cl 15.8%.

IR Spectrum (cm$^{-1}$, KBr tablet):
3200–2400; $\nu$O-H
2950 (shoulder), 2900, 2850; $\nu$CH
1700; $\nu$C=O
1450, 1430, 1410; $\delta$CH NRM Spectrum ( $\delta$, $CD_3SOCD_3$)
1.55 (doublet, 6H); hydrogen in $\delta$-position from Cl group
2.03 (doublet, 8H)
2.05–2.25 (2H); hydrogen in bridgehead position
Mass spectrum (m/e (relative intensity))
230 (6); P+2
228 (15); P
210 (6); P—$H_2O$ 193 (100); P—(Cl)
169 (74); P—(CH₂COOH)
133 (48)

EXAMPLE 6

Hydrogen bromide gas was introduced at a rate of 100ml./min. into a mixture of 4 g of 1-adamanatylacetic acid, 75ml. of carbon tetrachloride and 200 g of 96 % sulfuric acid which was kept at 5°–10°C by external cooling for 4 hours while a mixture of 6 g of t-butanol and 20ml. of carbon tetrachloride was added thereto dropwise over 30 minutes. Thereafter, the same procedure as in Example 5 was repeated to obtain 5.07 g (yield: 89.9 %) of crude 1-bromo-3-carboxy methyladamantane of m.p. 196°–200°C.

The product was recrystallized from a mixture of water and methanol (3:7) to obtain the pure product of m.p. 197°–199°C (Melting point 198°–199°C according to Bott, et al., the above mentioned literature).

Elementary analysis:
Calcd. for $C_{12}H_{17}O_2Br$: C 52.76; H 6.27; Br 29.26%.
Found: C 52.5; H 6.2; Br 29.4%.

The IR Spectrum, NMR spectrum and mass spectrum of the product coincided with those of a sample obtained by a process of Bott, et al.

EXAMPLE 7

5.27 Grams (yield: 93 %) of crude 1-chloro-3-(p-nitrophenyl)-adamantane were obtained from 5 g of 1-9p-nitrophenyl)-adamantane in the same manner as in Example 1. M.p. 99°–103°C.

The product was recrystallized from methanol to obtain the pure product of m.p. 104°–105.5°C.

Elementary analysis:
Calcd. for $C_{16}H_{18}NO_2Cl$: C 65.86; N 4.80; Cl 12.15%.
Found: C 66.2; N 4.6; Cl 12.0%.

IR Spectrum (cm⁻¹, KBr tablet)
3070; $\nu$C-H (Benzene nucleus)
2940, 2900, 2850; $\nu$CH
1600, 1590, 1500; (Benzene nucleus)
1510, 1350; $\nu$-NO₂

NMR Spectrum ( $\delta$, CDCl₃)
1.76 (2H)
1.90 (doublet, 4H)
2.18 (4H)
2.27 (2H)
2.3–2.5 (2H)
7.80 (AB Group, $\Delta\nu$=40 cps, J=9 cps, 4H)

EXAMPLE 8

The procedure of Example 1 was repeated by using 5 g of 1-chloroadamantane. The concentrated carbon tetrachloride solution was subjected to gas chromatography (packing: liquid; silicon SE-30, carrier; chromosorb-W). The peak of only 1-chloroadamantane was observed but no peak of 1,3-dichloroadamantane was observed.

The embodiments of the invention in which an exclusive property or privilege is claimed are defined as follows:

1. A method for preparing a compound of the formula

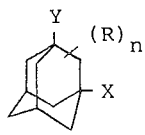

wherein
Y is H or a substituent having a Taft's polar substituent constant of not more than about +1.50,
X is chloro or bromo,
R is H or alkyl of one to 4 carbon atoms, and
n is 1 or 2,
which comprises forming a reaction mixture consisting essentially of (1) sulfuric acid having a concentration of 70 to 98 weight percent, (2) carbon tetrachloride or cyclohexane and (3) a compound of the formula

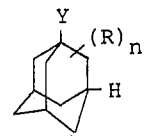

wherein Y, R and n are as defined above,
adding to said reaction mixture, at from 0° to 20°C, continuously or in increments over an extended period of time, (4) a compound of the formula MX, wherein X is as defined above and M is H, alkali metal, alkaline earth metal, boron or aluminum, and simultaneously adding to said reaction mixture in increments over a period of time of at least about 10 minutes, (5) t-butanol, while vigorously stirring the reaction mixture,
the total amount of t-butanol (5) added to the reaction mixture over said time period of at least about 10 minutes being from 1 to 5 moles per 1 mole of compound (3), the amount of sulfuric acid (1) in the reaction mixture being from 10 to 80 parts by weight per one part by weight to t-butanol added to the reaction mixture, the amount of carbon tetrachloride or cyclohexane (2) in the reaction mixture being from 10 to 30 parts by weight per one part by weight of compound (3) and the amount of compound MX (4) added to the reaction mixture being from 5 to 20 moles per one mole of compound (3), the compound MX (4) being added at a rate relative to the rate of adding t-butanol, such that at least one equivalent of MX, per 1 mole of compound (3), shall have been added to the reaction mixture before completion of the addition of t-butanol (5) and the addition of compound MX (4) being continued after the addition of t-butanol (5) is completed;
and recovering the compound of the first-named formula from the reaction product.

2. The method according to claim 1 wherein the reaction temperature is maintained in the range of 5° to 10°C.

3. The method according to claim 1 wherein the time duration of adding the t-butanol is at least 15 minutes.

4. The method according to claim 3 wherein the t-butanol is added dropwise.

5. A method for preparing a compound of the formula

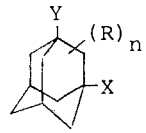

wherein
Y is H or a substituent having a Taft's polar substituent constant of not more than about +1.50,
X is chloro or bromo,
R is H or alkyl of one to 4 carbon atoms, and
n is 1 or 2,
which comprises forming a reaction mixture consisting essentially of (1) sulfuric acid having a concentration of 90 to 98 weight percent, (2) carbon tetrachloride or cyclohexane and (3) a compound of the formula

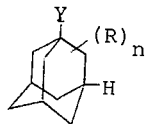

wherein Y, R and n are as defined above,
adding to said reaction mixture, at from about 5° to 10°C, continuously or in increments over an extended period of time, (4) a compound of the formula MX, wherein X is as defined above and M is H, alkali metal, alkaline earth metal, boron or aluminum, the compound (4) being added at the rate of higher than 6 mole/hr. of compound (4), per mole of compound (3),
and simultaneously adding to said reaction mixture in increments over a period of time of from 10 to 60 minutes, (5) t-butanol dissolved in carbon tetrachloride or cyclohexane, while vigorously stirring the reaction mixture,
the total amount of t-butanol (5) added to the reaction mixture over said time period of about 10 to 60 minutes being from 2 to 3 moles per 1 mole of compound (3), the amount of sulfuric acid (1) in the reaction mixture being from 20 to 60 parts by weight per one part by weight of t-butanol added to the reaction mixture, the amount of carbon tetrachloride or cyclohexane (2) in the reaction mixture being from 10 to 30 parts by weight per one part by weight of compound (3) and the amount of compound MX (4) added to the reaction mixture being from 5 to 20 moles per 1 mole of compound (3), the compound MX (4) being added at a rate relative to the rate of adding t-butanol such that from about two to three equivalents of MX, per 1 mole of compound (3), shall have been added to the reaction mixture before completion of the addition of t-butanol (5);
continuing the addition of compound MX (4) and continuing the reaction for at least one hour after completing the addition of t-butanol;
and recovering the compound of the first-named formula from the reaction product.

* * * * *